United States Patent [19]
Link et al.

[11] Patent Number: 5,799,766
[45] Date of Patent: Sep. 1, 1998

[54] ARRANGEMENT FOR THE ATTACHMENT OF A FLYWHEEL TO A CRANKSHAFT

[75] Inventors: Achim Link, Schweinfurt; Heiko Schulz-Andres, Reinfeld; Reinhold Weidinger, Unterspiesheim; Klaus Gorzitzke, Gochsheim; Günther Esly, Wasserlosen; Andreas Krause, Mainberg; Thomas Stretz, Gochsheim; Markus Wirbel, Bergrheinfeld; Reinhard Deppert, Gochsheim, all of Germany

[73] Assignee: Fichtel & Sachs AG, Schweinfurt, Germany

[21] Appl. No.: 651,575

[22] Filed: May 22, 1996

[30] Foreign Application Priority Data

May 22, 1995 [DE] Germany ............ 195 18 678.8

[51] Int. Cl.⁶ .......... B60K 17/02; F16F 15/315; F16D 13/58
[52] U.S. Cl. .............. 192/70.16; 192/DIG. 1; 74/572; 403/260; 403/359
[58] Field of Search .......... 192/70.13, 70.16, 192/110 R, 110 S, DIG. 1; 74/572; 403/260, 262, 359

[56] References Cited

U.S. PATENT DOCUMENTS

| 5,191,810 | 3/1993 | Craft et al. ............... 74/572 |
| 5,279,183 | 1/1994 | Förster et al. ............ 74/572 |
| 5,407,047 | 4/1995 | Weidinger et al. ........ 192/70.13 |
| 5,480,016 | 1/1996 | Kurz et al. ............... 192/70.16 |
| 5,524,739 | 6/1996 | Baier et al. .............. 192/70.16 |

FOREIGN PATENT DOCUMENTS

| 3838307 | 5/1990 | Germany ............ 192/70.13 |
| 4013298 | 10/1991 | Germany . |
| 0395497 | 7/1933 | United Kingdom . |
| 0772121 | 4/1957 | United Kingdom . |
| 1156678 | 7/1969 | United Kingdom . |
| 1537376 | 12/1978 | United Kingdom . |

*Primary Examiner*—Richard M. Lorence
*Attorney, Agent, or Firm*—Nils H. Ljungman and Associates

[57] ABSTRACT

The present invention generally relates to the attachment of a centrifugal mass or a modular clutch to the output end of a crankshaft of an internal combustion engine. For this purpose, axially-oriented gear teeth can be introduced in both parts, e.g. a serration, and there can be a central screw element which can extend into a threaded portion in the crankshaft. The present invention teaches that an axially-oriented spring bias can be applied to both parts to create a reliable connection between the parts of the gear teeth.

19 Claims, 11 Drawing Sheets

1

ARRANGEMENT FOR THE ATTACHMENT OF A FLYWHEEL TO A CRANKSHAFT

BACKGROUND OF THE INVENTION

1. Field of the Invention

The present invention generally relates to the attachment of a centrifugal mass or a modular clutch to the output-side end of a crankshaft. It should be noted that the attachment to the crankshaft can relate not only to a centrifugal mass or a modular clutch, but also, for example, to a hydrodynamic torque converter or the primary mass of a flywheel having two centrifugal masses.

2. Background Information

It should be understood that the attachment of additional components to the crankshaft—e.g. in the form of an auxiliary or accessory drive—can also be made on the side of the crankshaft opposite the output.

The attachment of a centrifugal mass to the output-side end of a crankshaft is disclosed, for example, in German Unexamined Patent Application 40 13 298, which corresponds to U.S. Pat. No. 5,279,183. The publication cited herein shows an axially-oriented serration, or toothing, between the crankshaft and the centrifugal mass, whereby the crankshaft and the centrifugal mass are held together by a central screw element. This solution, of course, offers the advantage that essentially only a few individual parts are required, but this solution can be limited in terms of its transmission capability with regard to strong dynamic loads.

OBJECT OF THE INVENTION

An object of the present invention is to create a reliable and economical type of connection for the attachment of a centrifugal mass to the end of a crankshaft by means of axially-oriented gear teeth.

SUMMARY OF THE INVENTION

The present invention teaches that this object, as described hereinabove, can be accomplished in accordance with the embodiments of the present invention, wherein as a result of the application of an axial spring bias to the components which are realized with the gear teeth, settling losses, or wear which can occur on all components which participate in the generation of the axial force can be essentially offset. These settling losses can occur both in the gear teeth themselves as a result of imprecise manufacturing tolerances, and on the points of contact between the components which participate in the application of the axial force. As a result of this measure, the present invention can essentially guarantee that a permanent, mutual contact is properly maintained at the points of contact between the gear teeth.

According to an additional embodiment of the present invention, it can be advantageous that the central screw element is realized in the form of an anti-fatigue screw (i.e. externally relieved bolt, necked-down bolt, waisted bolt). It is therefore possible to use a readily-available component (i.e. an anti-fatigue screw), the characteristics of which are well-known.

The centrifugal mass can thereby advantageously be configured so that in the radially inner area thereof, directly radially inside the gear teeth, the centrifugal mass can be provided with a collar which points in the axial direction toward the crankshaft. The collar can penetrate a corresponding concentric opening in the crankshaft for pre-centering, whereby the base of the collar can be provided with a passage opening for the anti-fatigue screw. As a result of the one-piece design of a collar on the centrifugal mass, the centrifugal mass, in particular when it is made of thin-walled material, can be made essentially very rigid and stable so that the centrifugal mass can retain its shape.

The present invention also teaches that the centrifugal mass can be bordered radially inside the gear teeth by the opening, the screw head of the anti-fatigue screw can have an outside diameter which is approximately equal to the opening, and there can be an essentially inelastic packing disc located axially between the centrifugal mass and the screw head. Such a realization can be particularly economical, because standard anti-fatigue screws can be used, even if the diameter of the heads of the screws does not match the other dimensions of the crankshaft and centrifugal mass.

In one particularly simple solution, the present invention teaches that the centrifugal mass can be bordered radially inside the gear teeth by the opening, and the diameter of the screw head of the anti-fatigue screw can be enlarged so that it essentially covers, or overlaps, the ring-shaped area of the gear teeth in the centrifugal mass. In the ring-shaped area in the centrifugal mass, the screw head can be in axially flexible contact with the centrifugal mass. Such a design can essentially require a particularly small number of individual parts.

The screw head of the anti-fatigue screw can thereby also be elongated in the axial direction, and can have a hole which can extend over a portion of the elongation. As a result of such a realization, the anti-fatigue screw can easily be matched to the dimensions of a particular crankshaft and flywheel.

In an additional and essentially simple embodiment, the present invention teaches that the central screw element can be realized in the form of a relatively inelastic fastening screw. Between the fastening screw and the ring-shaped area of the centrifugal mass, a pot-shaped component can be provided, in the base part of which pot-shaped component there can be an opening for the passage of the fastening screw. The encircling pot edge of the pot-shaped component can extend radially outward and can be realized elastically in the manner of a plate spring, and can be in contact at some radial distance from the pot body with the ring-shaped area of the centrifugal mass. In such a design, a mass-produced screw can be used, whereby the pot-shaped component can essentially be optimally designed for the task it is intended to perform, both from the point of view of the shaping processes and the material used.

The present invention teaches that the pot edge can have a curved contour on the side facing the ring-shaped area of the centrifugal mass. In the event of an elastic deformation of the pot edge, it can thereby essentially be guaranteed that the surface pressure at this point will not reach any undesirable peaks.

The pot-shaped component can be fixed in position and held in a captive manner particularly advantageously by means of a retaining element. The retaining element can be located on the centrifugal mass, radially outside the ring-shaped area. The assembly can be thereby significantly simplified, in particular with regard to pre-centering.

The retaining element advantageously can consist of a sheet metal part which can be realized approximately in the shape of a pot, and can have a pot edge which can be substantially perpendicular to the axis of rotation (which pot edge can be in contact with the centrifugal mass on the side facing the gear teeth, and can be fastened there), a pot wall which can be concentric to the axis of rotation (which wall can include the pot edge of the component), as well as a base which can have an opening which can axially fix the position of the pot-shaped component. Essentially, such a sheet metal part can be easy to manufacture and can be fastened to the flywheel in a simple and standard manner.

The opening in the center of the retaining element can thereby be realized so that the base fixes the screw element in a captive manner. In this manner, both the pot-shaped component and the fastening screw can be pre-assembled and the screw can be held in a captive manner.

The present invention also teaches that for precentering the centrifugal mass or the modular clutch and the crankshaft during assembly, the outside diameter of the pot body can be inserted with a small radial clearance in a corresponding opening in the crankshaft. As a result of such a precentering it can be possible for the person performing the centering to first center the complete modular clutch with both hands, and then hold this modular clutch in the pre-centered position with one hand and operate a screwdriver with the other hand.

The screw element can thereby be held in the pot-shaped component in a captive manner, so that the diameter of the screw head is coordinated to the diameter of the internal gear teeth of the hub of the clutch disc (i.e., the diameter of the screw head can be larger than the inside diameter of the internal gear teeth of the hub) and the length of the screw element can be at least long enough so that when the head of the screw element comes into contact with the hub, the threaded part of the screw element can extend into the opening of the base part of the pot-shaped component. Essentially, such a realization can be particularly simple to use in modular clutches, since no additional elements are necessary for the captive mounting of the fastening screw.

In one particularly advantageous solution, the present invention teaches that the central screw element can be realized in the form of a relatively inelastic fastening screw, and a plate spring under bias can be located between the head of the fastening screw and the ring-shaped area of the centrifugal mass. In this manner, on one hand a readily-available, economical fastening screw can be used, and on the other hand the spring characteristics of the plate spring can be used to provide the axial bias. The outside diameter of the head of the fastening screw can thereby be kept larger than the inside diameter of the opening in the centrifugal mass, so that the plate spring can be pulled into a block in a particularly simple manner.

The present invention also teaches that the centrifugal mass can be realized in the form of a thin-walled component, at least in the ring-shaped area, and that the material cross section of the centrifugal mass can be matched to the gear teeth, and the material cross section of the centrifugal mass can be inserted between the gear teeth of the crankshaft and the pot-shaped component. Such a construction can be particularly advantageous when the centrifugal mass must be connected to the crankshaft by means of a thin-walled component, which is conventional, for example, on torque converters.

The pot-shaped component can thereby preferably be radially fixed by means of the outside diameter of its pot edge in a corresponding recess, or notch, in the flywheel, on the side farther from the crankshaft, so that it can be easy to establish the radial correspondence between the flywheel and the pot-shaped component.

The present invention teaches that the serration, or toothing, can be realized so that the flanks of the individual teeth form a cone which can be concentric to the axis of rotation, whereby the cone can intersect the axis of rotation outside the crankshaft. Such a realization of the serration can make possible a better introduction of the force from the crankshaft into the centrifugal mass by reducing stress peaks and by eliminating cross sections which are unsuitably small.

As a result of the arrangement of a plurality of tabs which can extend radially inward in the base of the component, the fastening screw can be held captive during the assembly process, if the ends of the tabs are engaged in the threads of the fastening screw, and/or in the space between the head-side thread runout and the head, so that the fastening screw can be screwed immediately from the captive position into the corresponding thread.

The embodiments of the present invention discussed hereinabove will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the present invention resides broadly in a friction clutch assembly, for use in connection with an internal combustion engine, the assembly comprising: a flywheel; a clutch housing; a hub; the hub defining an axis of rotation and an axial direction parallel to the axis of rotation; a clutch disc disposed within the clutch housing, the clutch disc coaxially surrounding the hub; pressure plate means disposed within the clutch housing and movable in the axial direction, the pressure plate means for applying an axial force to the clutch disc along the axial direction; biasing means for biasing the pressure plate means in the axial direction; the flywheel being disposed substantially adjacent the clutch disc; the clutch disc being disposed between the pressure plate means and the flywheel; the clutch disc comprising friction lining means; the friction lining means being disposed substantially between the pressure plate means and the flywheel; means for meshing with a crankshaft; the means for meshing having an annular configuration; the means for meshing being substantially coaxial with the axis of rotation; the assembly further comprising: bolt means; and means for biasing the means for meshing toward a crankshaft; the means for meshing comprising means for engaging teeth on a crankshaft; the bolt means comprising a shaft portion and a head portion; the shaft portion of the bolt means comprising a threaded portion; and the bolt means for attaching the flywheel to a crankshaft.

Another aspect of the present invention resides broadly in a combination of a crankshaft and a friction clutch assembly, for use in connection with an internal combustion engine, the combination comprising: a crankshaft; a flywheel; a clutch housing; a hub; the hub defining an axis of rotation and an axial direction parallel to the axis of rotation; a clutch disc disposed within the clutch housing, the clutch disc coaxially surrounding the hub; pressure plate means disposed within the clutch housing and movable in the axial direction, the pressure plate means for applying an axial force to the clutch disc along the axial direction; biasing means for biasing the pressure plate means in the axial direction; the flywheel being disposed substantially adjacent the clutch disc; the clutch disc being disposed between the pressure plate means and the flywheel; the clutch disc comprising friction lining means; the friction lining means being disposed substantially between the pressure plate means and the flywheel; the flywheel comprising means for meshing with the crankshaft; the means for meshing with a crankshaft being first means for meshing; the first means for meshing having an annular configuration; the first means for meshing being substantially coaxial with the axis of rotation; the crankshaft comprising means for meshing with the first means for meshing; the means for meshing with the first means for meshing being second means for meshing; the second means for meshing having an annular configuration; the second means for meshing being substantially coaxial with the axis of rotation; the assembly further comprising: bolt means; and means for biasing the first means for meshing toward the crankshaft; the first means for meshing comprising means for engaging teeth on a crankshaft; the second means for meshing comprising means for engaging teeth on a flywheel; the bolt means comprising a shaft portion and a head portion; the shaft portion of the bolt means comprising a threaded portion; the bolt means for attaching the flywheel to the crankshaft; the crankshaft comprises a recess; the recess faces substantially toward the friction clutch assembly; the recess has a central longitudinal axis being substantially coaxial with the axis of rotation; the recess comprises an internal surface, the internal surface comprising threads receiving the threaded portion of the bolt means; the bolt means attaching the flywheel to the crankshaft; the flywheel has a first face and a second face; the first face of the flywheel faces substantially axially toward the clutch disc; the second face of the flywheel faces substantially axially opposite the first face of the flywheel and toward the crankshaft; the means for engaging teeth on the crankshaft comprises a first set of gear teeth; each tooth of the first set of gear teeth has a longitudinal axis, a crown part, and a base part; the each tooth of the first set of gear teeth has a first face and a second face, each the face has portions generally parallelly aligned with the longitudinal axis of the each tooth of the first set of gear teeth; the each tooth of the first set of gear teeth has a first end and a second end disposed substantially opposite one another along the longitudinal axis and substantially transverse to the longitudinal axis, the first end and the second end are disposed between the first face and the second face; the each tooth of the first set of gear teeth has a plane, the longitudinal axis of the each tooth of the first set of gear teeth is located on the plane, the plane bisects the each tooth from the crown part through the base part, thereby dividing the each tooth of the first set of gear teeth into substantially equal portions; the axis of rotation and the longitudinal axis of the each tooth of the first set of gear teeth generally intersect one another; the longitudinal axes of the gear teeth of the first set of gear teeth have a selected angular orientation with respect to the axis of rotation; the selected angular orientation of the gear teeth of the first set of gear teeth is a non-zero angle; the non-zero angle is substantially greater than zero; the second means for meshing comprising a second set of gear teeth; each tooth of the second set of gear teeth has a longitudinal axis, a crown part, and a base part; the each tooth of the second set of gear teeth has a first face and a second face, each the face has portions generally parallelly aligned with the longitudinal axis of the each tooth of the second set of gear teeth; the each tooth of the second set of gear teeth has a first end and a second end disposed substantially opposite one another along the longitudinal axis and substantially transverse to the longitudinal axis, the first end and the second end are disposed between the first face and the second face; the each tooth of the second set of gear teeth has a plane, the longitudinal axis of the each tooth of the second set of gear teeth is located on the plane, the plane bisects the each tooth from the crown part through the base part, thereby dividing the each tooth of the second set of gear teeth into substantially equal portions; the axis of rotation and the longitudinal axis of the each tooth of the second set of gear teeth generally intersect one another; the longitudinal axes of the gear teeth of the second set of gear teeth have a selected angular orientation with respect to the axis of rotation; the selected angular orientation of the gear teeth of the second set of gear teeth is a non-zero angle; the non-zero angle being substantially greater than zero; and the selected angular orientation of the gear teeth of the second set of gear teeth is supplemental to the selected angular orientation of the gear teeth of the first set of gear teeth.

BRIEF DESCRIPTION OF THE DRAWINGS

The present invention is explained in greater detail below with reference to the embodiments illustrated in the accompanying drawings, wherein:

FIG. 7 is a partial section through a centrifugal mass fastening, shown in the unassembled state;

DESCRIPTION OF THE PREFERRED EMBODIMENT

Figure 1:
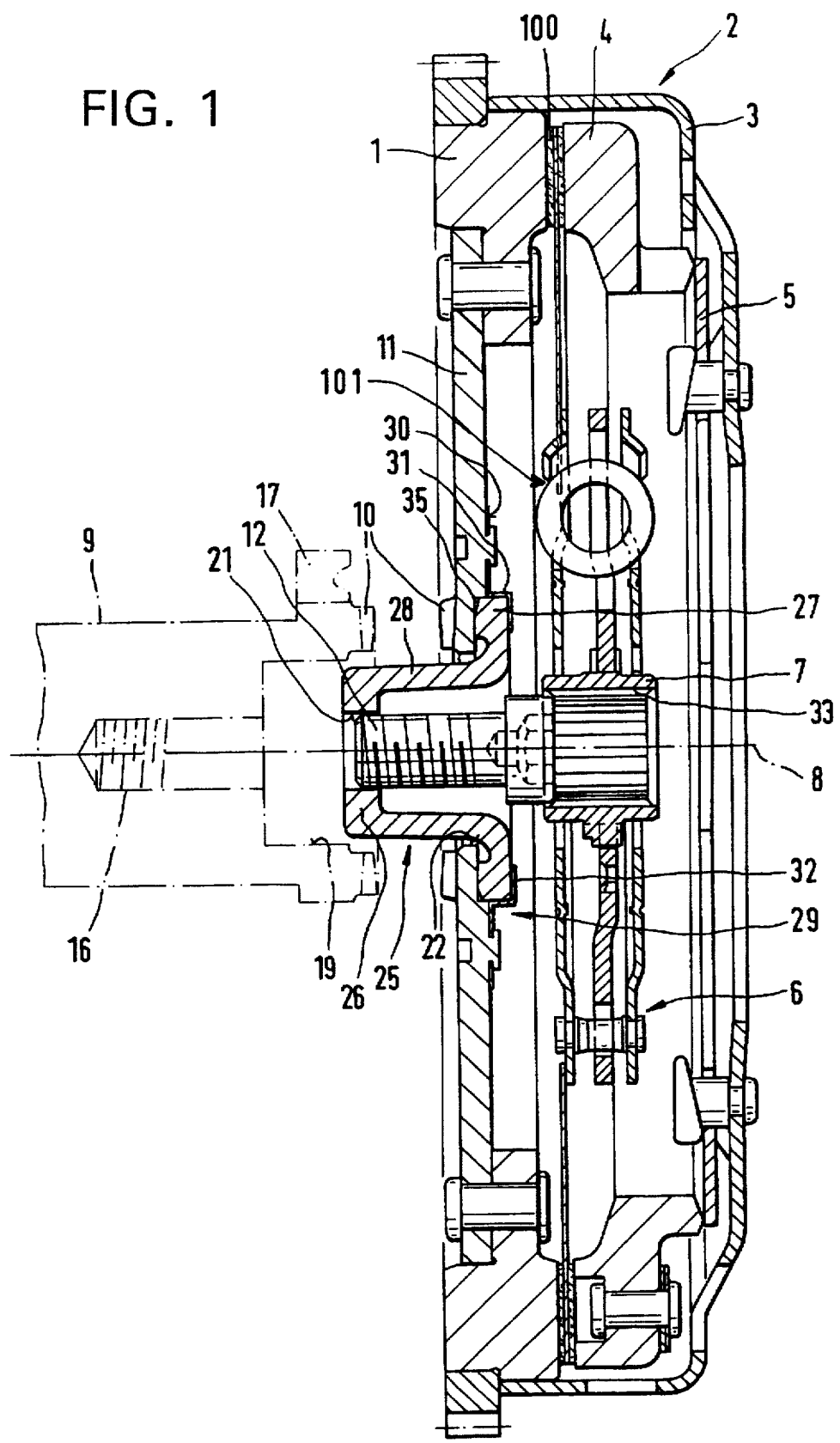
FIG. 1 is a longitudinal section through a complete modular clutch.

FIG. 1 shows a longitudinal section through a modular clutch 2 which can preferably be connected with the end of a crankshaft 9. The modular clutch 2 can include a clutch housing 3, in which an application plate 4 can be fastened non-rotationally but so that it move axially. Supported on the clutch housing 3 can be a membrane spring 5 which can exert a bias force on the application plate 4, namely in the direction of the centrifugal mass 1. A clutch disc 6 can be clamped between the application plate 4 and the centrifugal mass 1. A torsional vibration damper 101 can be located between the friction linings 100 of the clutch disc 6 and the hub 7 of the clutch disc 6. The hub 7 can be provided with internal gear teeth 33 which internal gear teeth 33 can be used to create a non-rotational connection with a transmission shaft (not shown). In a modular clutch 2, the entire friction clutch can be pre-assembled with its clutch housing 3 on the centrifugal mass 1, and the entire friction clutch can be transported and installed, as a unit, on the crankshaft 9. In this case, the centrifugal mass 1 can be located essentially only in the radially outer area of the modular clutch 2, and the centrifugal mass 1 can be extended inward by means of an additional component which can be realized in the form of a disc 11 and can be manufactured, for example, from relatively thin-walled sheet metal. The disc 11, in its radially inner area, can be provided with gear teeth 10 which point axially toward the crankshaft 9. The gear teeth 10 of the disc 11 preferably correspond to the gear teeth 10 on the end of the crankshaft 9, which gear teeth 10 on the end of the crankshaft 9 point toward the flywheel 1. The two parts of the gear teeth 10, when assembled, can be located in an axially overlapping ring-shaped area concentric to the axis of rotation 8.

During operation, the crankshaft 9 and the modular clutch 2 can rotate around the axis of rotation 8. Radially directly inside the gear teeth 10, the disc 11 can be provided with an opening 22, through which opening 22 a pot-shaped component 25 can extend with its pot-shaped body 28. On the side of the disc 11 farther (axially opposite) from the gear teeth 10, the component 25 can be provided with a pot edge 27 which pot edge 27 preferably projects radially outward, and in the ring-shaped area of the gear teeth 10 the pot edge 27 can be in contact with the inside of the disc 11. The pot-shaped body 28 can extend toward the crankshaft 9 and, in the terminal area of the component 25 farther from the pot edge 27, the pot-shaped body 28 can have a base part 26 with a passage opening 21. The passage opening 21 may be sized so that the threaded portion of a fastening screw 12 can be passed through the passage opening 21, but so that the head of the fastening screws 12 can be in contact with the base part 26. The pot-shaped component 25 can be held in a captive manner in the disc 11 by means of a retaining element 29. The retaining element 29 can be in the form of a sheet metal part which can be fastened to the side of the disc 11 farther (axially opposite) from the crankshaft 9. The retaining element 29 can be realized in the shape of a pot, and its pot wall 31 can include the outside diameter of the pot edge 27 of the component 25.

In other words, during operation of the modular clutch 2, the pot-shaped body 28 of the pot-shaped component 25 can extend through an opening 22 provided in the disc 11, as the modular clutch 2 and the crankshaft 9 rotate about the axis of rotation 8. The opening 22 can be located essentially radially directly inside the gear teeth 10. The component 25 can have a pot edge 27; the pot edge 27 can be located substantially axially opposite the base part 26 of the component 25, with respect to the pot-shaped body 28 of the component 25. The pot edge 27 can protrude radially outward and can be in contact with a radially and axially inner portion of the disc 11; in this case, axially inner or inward being in a direction from the crankshaft 9 axially toward the hub 7. Contact with the radially and axially inner portion of the disc 11 can thus be in the ring-shaped area of the gear teeth 10 of the disc 11. The base part 26 of the pot-shaped body 28 can have an opening 21, which opening 21 can be of a size suitable to pass the threaded portion of a fastening screw 12 therethrough, and the head of a fastening screw 12 can be in contact with the base part 26.

A retaining element 29, fashioned from a sheet metal part, can be attached to the axially inner side of the disc 11. (That is, the retaining element 29 can be attached to the side of the disc 11 facing axially away from the crankshaft 9). The retaining element 29 can hold the component 25 in position in the opening 22. The shape of the retaining element 29 can be that of a pot having a pot wall 31. The pot wall 31 can be shaped to conform to the outer diameter of the pot edge 27 of the component 25.

The retaining element 29 can be fastened to the disc 11 by means of the pot edge 30 of the retaining element 29. By means of its base 32, the retaining element 29 can include the pot edge 27 and can hold the pot-shaped component 25 in a captive manner. The retaining element 29 can preferably be fastened directly to the disc 11, e.g. by means of rivet extensions of the disc 11 (discussed further below with respect to FIG. 3a). The fastening screw 12 can also be held captive, because it is located inside the pot body 28 of the component 25, and because the outside diameter of its head can be larger than the inside diameter of the hub 7 with the gear teeth 33. On the crankshaft side, starting from the gear teeth 10, there can be an opening 19 which can be slightly larger in diameter than the pot-shaped component 25 having the outside diameter of the pot-shaped body 28. Moreover, in the crankshaft 9 there can be a thread 16 to screw in the fastening screw 12, because on the end of the crankshaft 9, pointing toward the modular clutch 2, on the cylindrical outside diameter of the crankshaft 9, there can be a crankshaft seal 17. By using the axially-directed gear teeth 10, the crankshaft seal 17 can be located essentially on a very small diameter of the crankshaft 9. Essentially, such a configuration can reduce both the friction of the crankshaft seal 17 and the cost thereof. The pot-shaped component 25, as shown in FIG. 1, can be axially pre-positioned in the radial direction by means of the outside diameter of its pot edge 27 in a recess 35 of the disc 11. As a result of the pre-positioning of the pot-shaped component 25, the pre-positioning of the retaining element 29 can be eliminated, or the retaining element 29 can be manufactured with greater tolerances.

Figure 2:
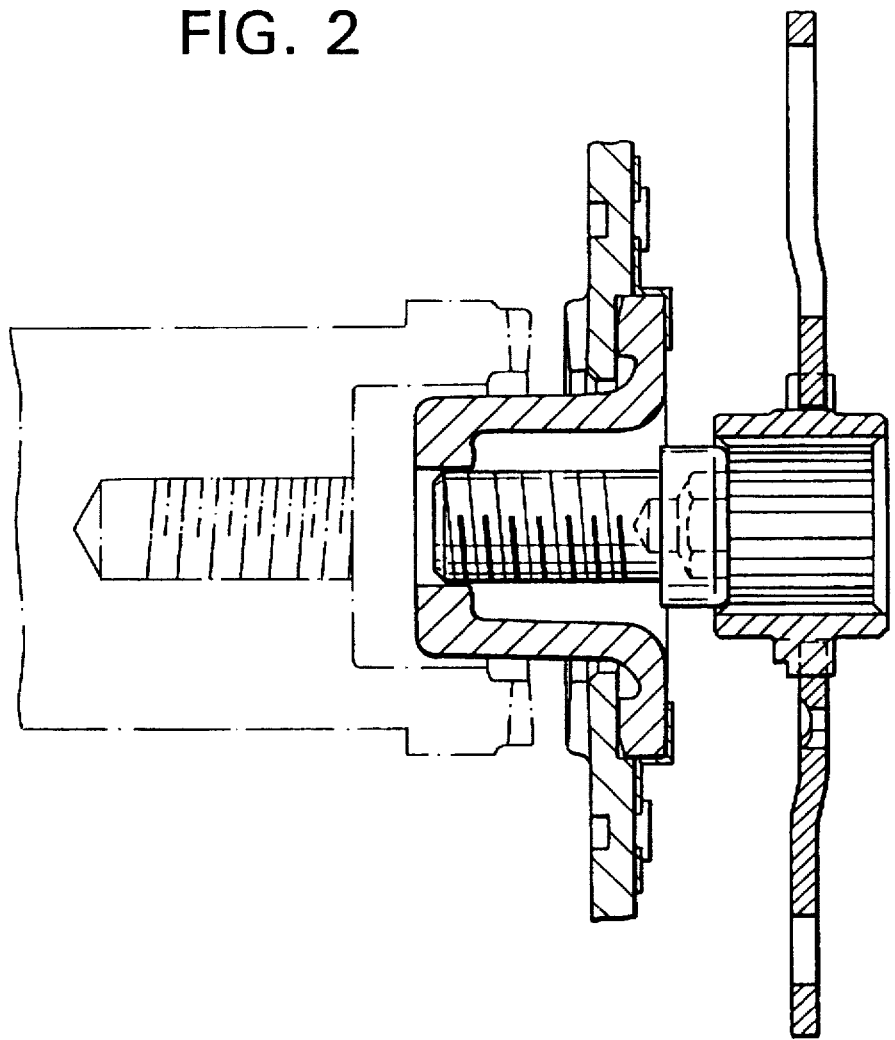
FIGS. 2, 3, and 4 show steps in the assembly of the modular clutch illustrated in FIG. 1.
Figure 3A:
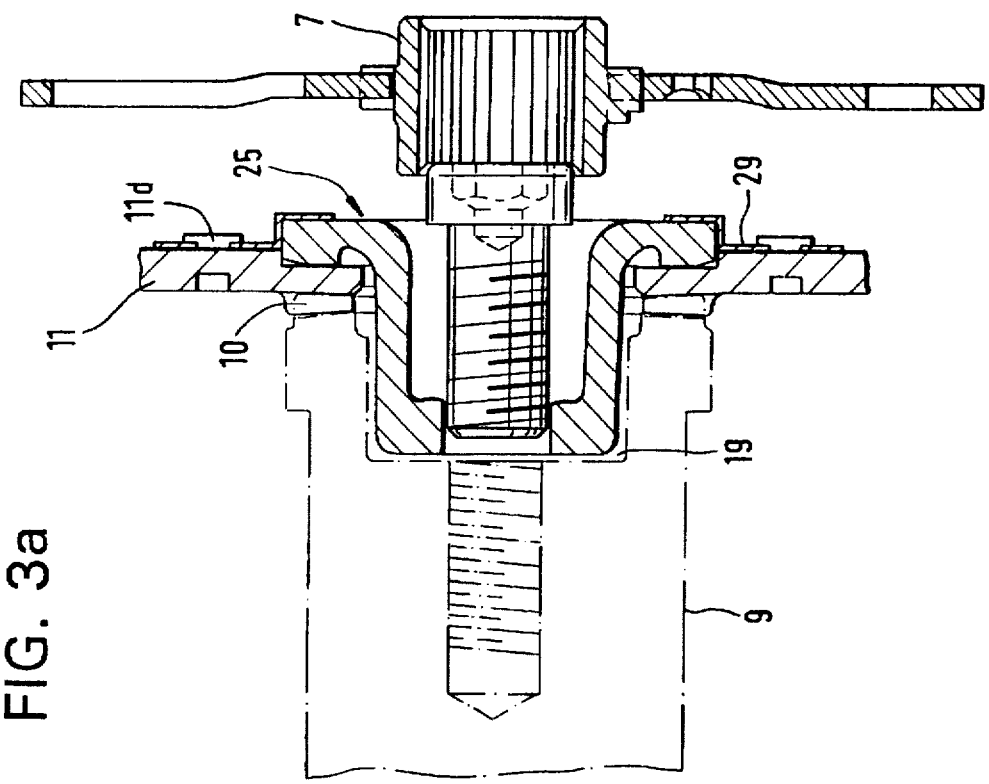
Figure 3:
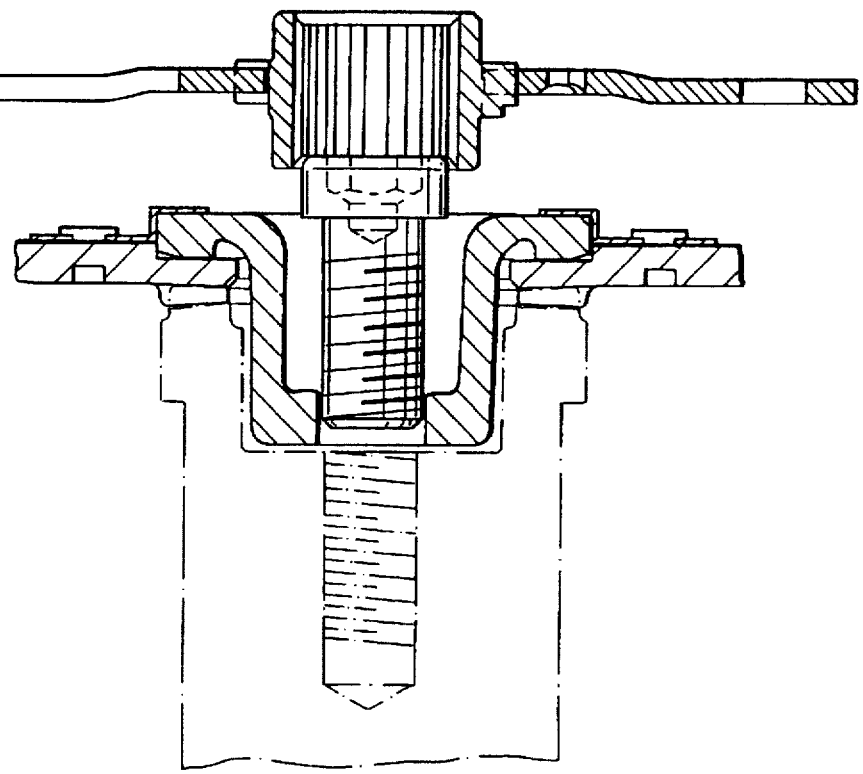
Figure 4A:
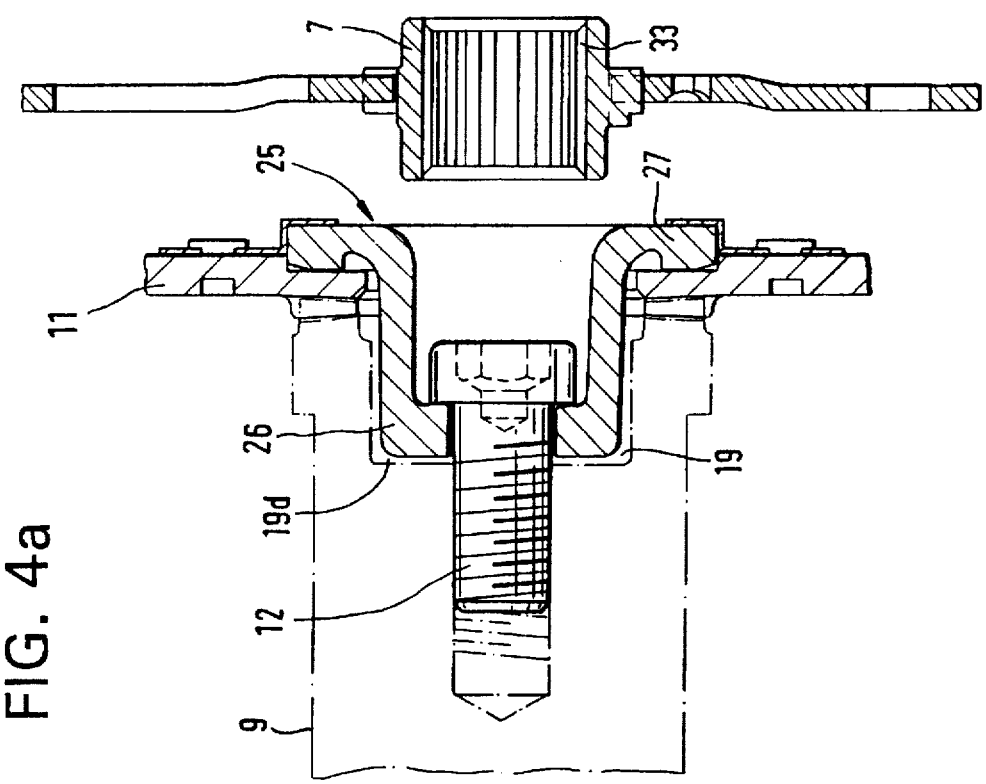
Figure 4:
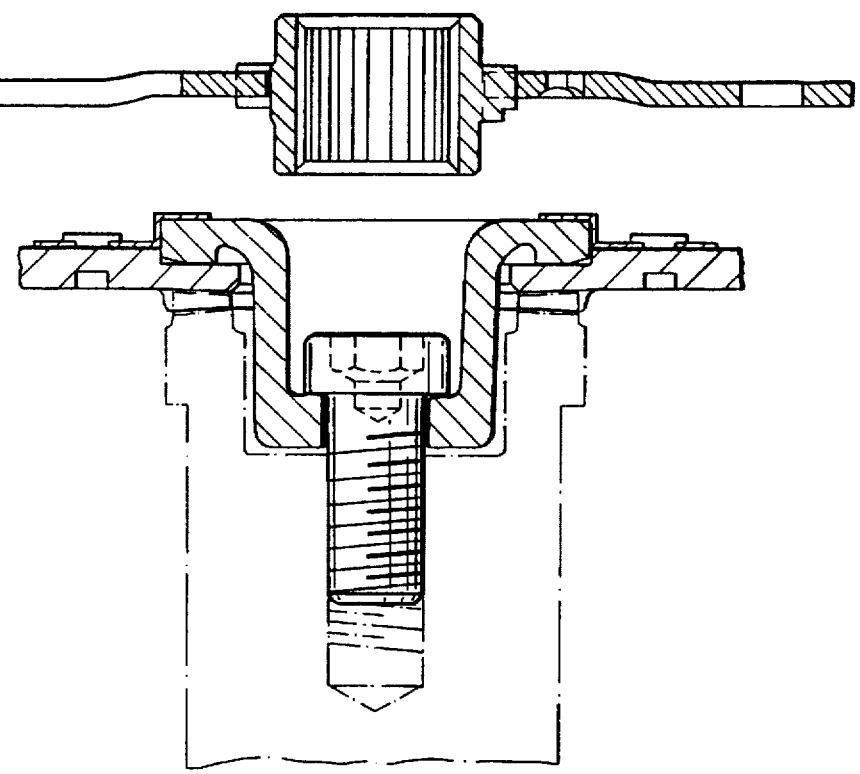

FIGS. 2, 3, and 4 illustrate various steps of the assembly process of the modular clutch 2, wherein only the components which run close to the axis of rotation 8 are shown.

FIG. 2 shows the introduction of the pot-shaped component 25 with its pot body 28 into the opening 19 of the crankshaft 9.

Figure 2A:
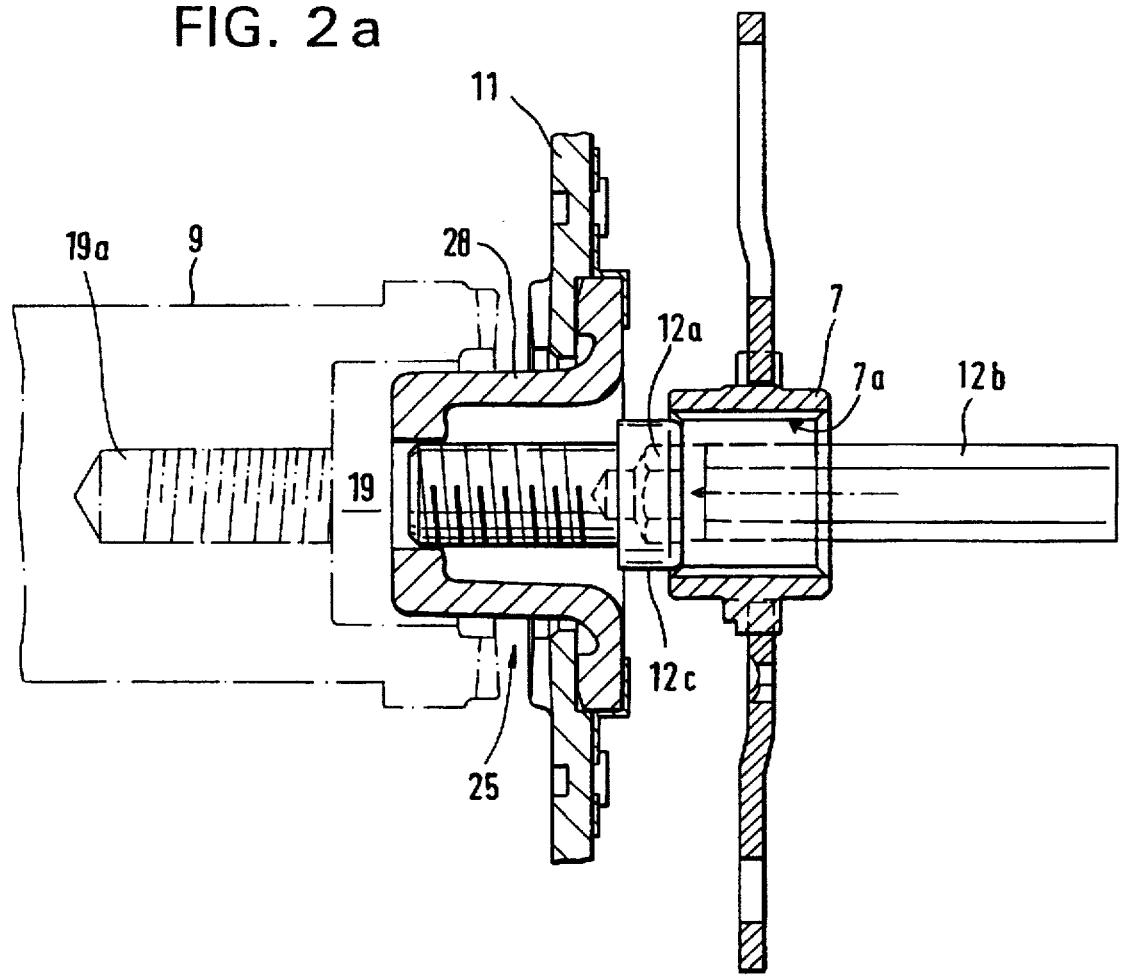
FIGS. 2a, 3a, and 4a are essentially the same as FIGS. 2, 3, and 4, but are more detailed.

FIG. 2a shows the introduction of the pot-shaped component 25 with its pot body 28 into the opening 19 of the crankshaft 9, and depicts a tool 12b, such as a hex key, which tool 12b can be inserted into and through the opening 7a in the hub 7. The tool 12b can then be inserted into a recess 12a in the head 12c of the screw 12, in order to turn the screw 12 into the threaded portion 19a of the opening 19 of the crankshaft 9.

FIG. 3 shows the fully-inserted position with an overlapping of the gear teeth 10 (also shown in FIG. 3a).

In accordance with at least one embodiment of the present invention, FIG. 3a shows the fully-inserted position of the component 25 into the opening 19 of the crankshaft 9. The gear teeth 10 of the disc 11 are shown as being essentially in mesh with the gear teeth 10 of the crankshaft 9. The retaining element 29 can be used to hold the component 25 in place with respect to the disc 11. Rivet extensions 11d can be used to secure the retaining element 29 in place. The rivet extensions 11d can be rivets inserted into the disc 11, and the heads of the rivet extensions can be tooled to hold the retaining element 29, once the retaining element 29 is properly positioned. The rivet extensions 11d can also be essentially true extensions of the disc 11. In this realization, the extensions 11d can be formed as a part of the disc 11 and can have the configuration of a rivet. The heads of the rivet extensions 11d can be tooled to hold the retaining element 29 in place, once the retaining element 29 is positioned properly.

FIG. 4 shows the final position with the fastening screw 12 screwed into the crankshaft 9. The crankshaft 9 can be accessible through the hub 7 or through the inside diameter of the gear teeth 33 by means of a tool. In the assembled position illustrated in FIG. 4, the gear teeth 10 can be held in active contact by means of the pot edge 27 which can be elastically biased in the axial direction. This axial bias can essentially guarantee that even in the event of peak torques, none of the flanks of the gear teeth 10 can become separated from one another, and thus cause noise and wear. The level of the elastic bias, as described herein, can thereby be determined by the corresponding degree to which the fastening screw 12 is tightened, but it is also possible to coordinate the axial depth of the opening 19 in the crankshaft 9 with the axial length of the pot-shaped component 25, so that when the fastening screw 12 is screwed tight, and thus when there is contact between the base part 26 of the component 25 and the shoulder formed by the opening 19 in the crankshaft 9, the specified bias can essentially be automatically achieved. As a result of this bias, settling or wear losses can be offset. Such losses can occur at all points of contact: e.g., in the gear teeth 10, between the component 25 and the disc 11, and between the fastening screw 12 and the base part 26.

In accordance with at least one embodiment of the present invention, FIG. 4a shows a final position of the introduction of the component 25 into the opening 19 of the crankshaft 9, as well as the final assembly position of the fastening screw 12 within the crankshaft 9. Insertion of a tool into the crankshaft 9 can be through the opening 7a (shown in FIG. 2a) within the inner diameter of the teeth 33 of the hub 7. In the position illustrated in FIG. 4a, the pot edge 27 of the component 25 can hold the gear teeth 10 in active contact. In this case, the pot edge 27 can be elastically biased in the axial direction. Noise and wear can result if the flanks of the gear teeth 10 become separated from one another. The axial bias of the pot edge 27 can essentially guarantee that such a separation will not happen, even in the event of peak torques. Tightening of the fastening screw 12 can essentially determine the degree of elastic bias.

It can also be possible to coordinate the axial depth of the opening 19, as shown in FIG. 4a, with the axial length of the pot-shaped component 25. With this coordination, the screw 12 can be threaded tightly into position so that there can be contact between the base part 26 of the component 25 and the shoulder 19d of the opening 19 of the crankshaft 9, and, essentially, the selected bias can be achieved automatically. Settling of wear losses can be offset as a result of this bias. All points of contact can suffer such losses. Losses can occur, for example, in the gear teeth 10, between the component 25 and the disc 11, and between the fastening screw 12 and the base part 26 of the component 25.

Figure 5:
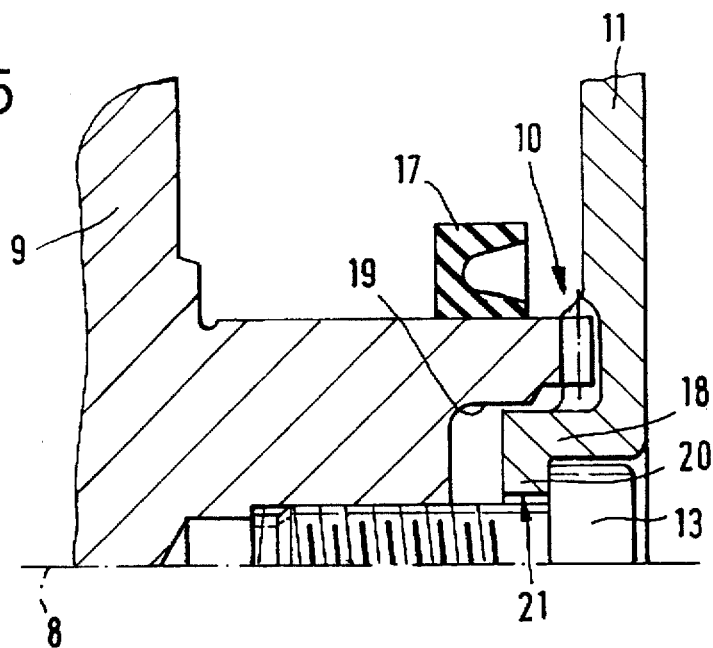
FIG. 5 shows a partial longitudinal section through a variant realization.

FIG. 5 illustrates an embodiment of the present invention in which the disc 11, in its radially inner terminal area, can be provided with a collar 18 which can run axially and can be oriented toward the crankshaft 9. The collar 18 is preferably provided with a base 20 in which there can be an opening 21 for the passage of an anti-fatigue screw 13. The collar 18 can extend into an opening 19 in the crankshaft 9, whereby there can be a slight clearance between the collar 18 and the crankshaft 9 in the radial direction. The gear teeth 10 can be applied on one hand against the terminal area of the crankshaft 9 facing the disc 11, and in the same ring-shaped area in the disc 11 there can be matching gear teeth 10, some of which gear teeth 10 can extend into the collar 18. The anti-fatigue screw 13 can hold the two sets of gear teeth 10 in mutual contact under axial bias. As a result of the presence of the collar 18, the radially inner area of the disc 11 can essentially be realized in a particularly rigid and stable manner.

Figure 6:
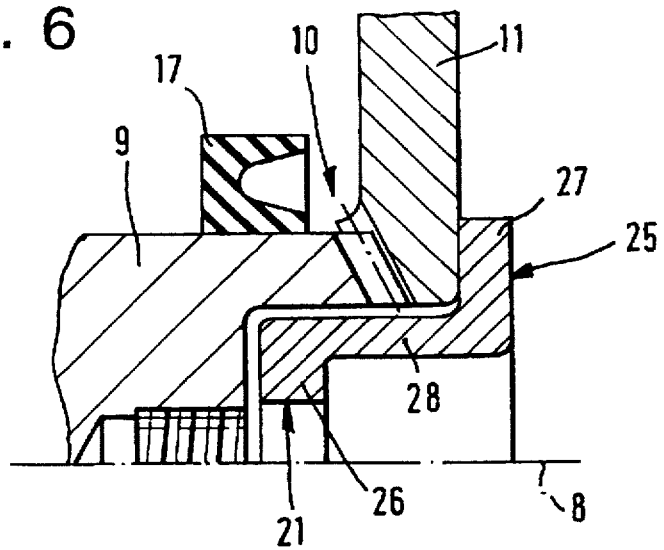
FIG. 6 is a partial longitudinal section through an additional embodiment.

FIG. 6 shows a particular embodiment of the gear teeth 10. On these gear teeth 10, the flanks of the individual teeth can be located on a cone, which cone can be concentric to the axis of rotation 8, whereby the cone can intersect the axis of rotation 8 outside the crankshaft 9. The bias can be applied to the gear teeth 10 analogous to FIGS. 1 to 4 by means of the flexible pot edge 27 of the pot-shaped component 25. This embodiment can make possible a more secure introduction of force from the crankshaft 9 into the disc 11, because the disc 11 essentially would not have any pronounced narrow points in its radially inner area in terms of the material cross section.

Figure 6A:
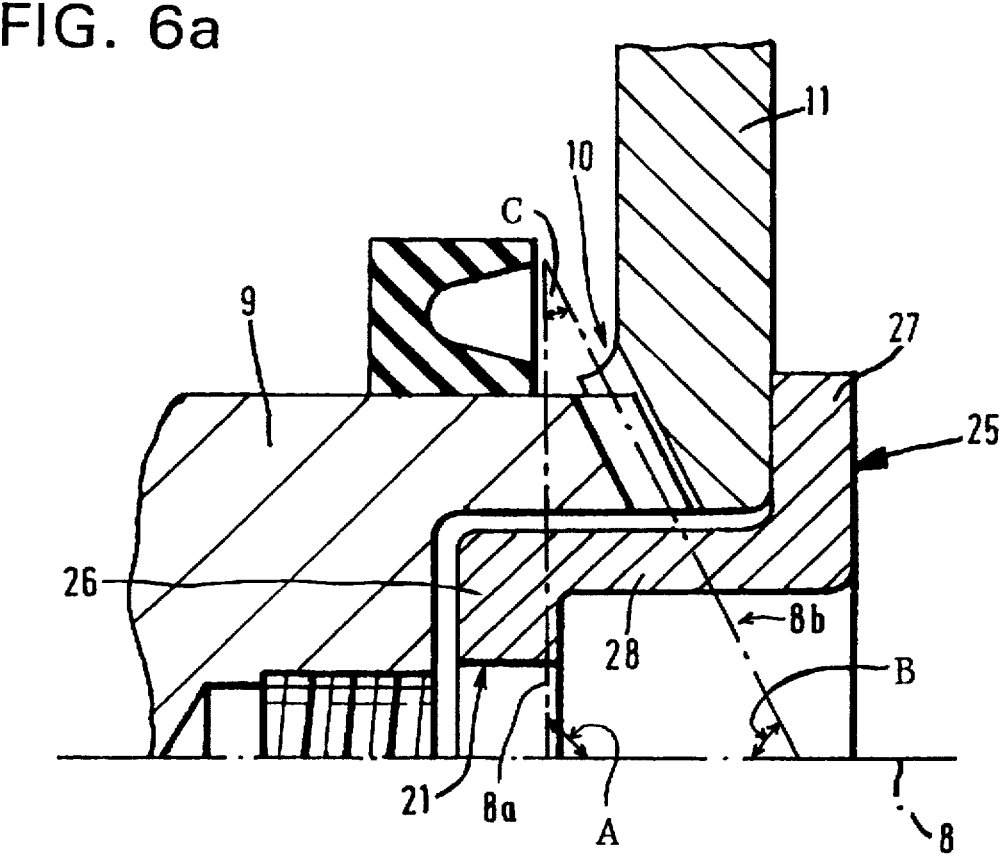
FIG. 6a is essentially the same as FIG. 6, but is more detailed.

In accordance with at least one embodiment of the present invention, FIG. 6a shows that the axis of rotation 8 can form the central longitudinal axis of a cone as described hereinabove with reference to FIG. 6. The line 8a can define a plane which can form the base of the cone, and line 8b can define the side of the cone. Line 8b can be essentially parallel to the gear teeth 10 of the crankshaft 9 and the gear teeth 10 of the disc 11. The two sets of gear teeth 10 can be in mesh with one another. The line 8a can be essentially perpendicular to the axis of rotation 8. The angle A, formed by the intersection of the axis of rotation 8 and the line 8a, can essentially be a right angle. In this particular case, the angle C, formed by the intersection of line 8a and line 8b, can be about 24°. The intersection of the axis of rotation 8 and line 8b can form the angle B, which angle B can be, in this case, an angle of about 66°. The cone can be, then, concentric to the axis of rotation 8. In this embodiment of the present invention, as well as the embodiment described hereinabove with reference to FIG. 6, bias can be applied to the gear teeth 10 analogous to FIGS. 1 to 4 by means of the flexible pot edge 27 of the pot-shaped component 25. The sizes of the various angles A, B, and C can, in other embodiments of the present invention, be different than those described herein. However, a more secure introduction of force from the crankshaft 9 into the disc 11 can be possible, according to this embodiment of the present invention, because the disc 11 essentially would not have any pronounced narrow points in its radially inner area in terms of the material cross section.

FIG. 7 shows a disc 11, not yet installed, which can be made of particularly thin-walled sheet metal material. In this case, axially-directed gear teeth 10 can be introduced both in the pot edge 27 of the pot-shaped component 25 and in the terminal area of the crankshaft 9. The radially inner area of the disc 11 can extend into the ring-shaped area formed by the gear teeth 10, and at this point in the peripheral direction, the material cross section of the disc 11 can match the gear teeth 10. During assembly of the crankshaft 9, disc 11, and pot-shaped component 25 by means of the fastening screw 12, the disc 11 can be non-rotationally clamped into the gear tooth area of the crankshaft 9 and component 25. Analogous to FIGS. 1 to 4, the fastening screw 12 can essentially be rigid in the axial direction, and the spring bias can be generated by the pot edge 27 of the component 25.

Figure 7B:
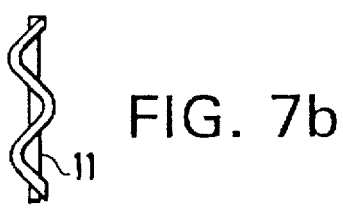
FIGS. 7a and 7b show details of a partial section through a centrifugal mass fastening.
Figure 7A:
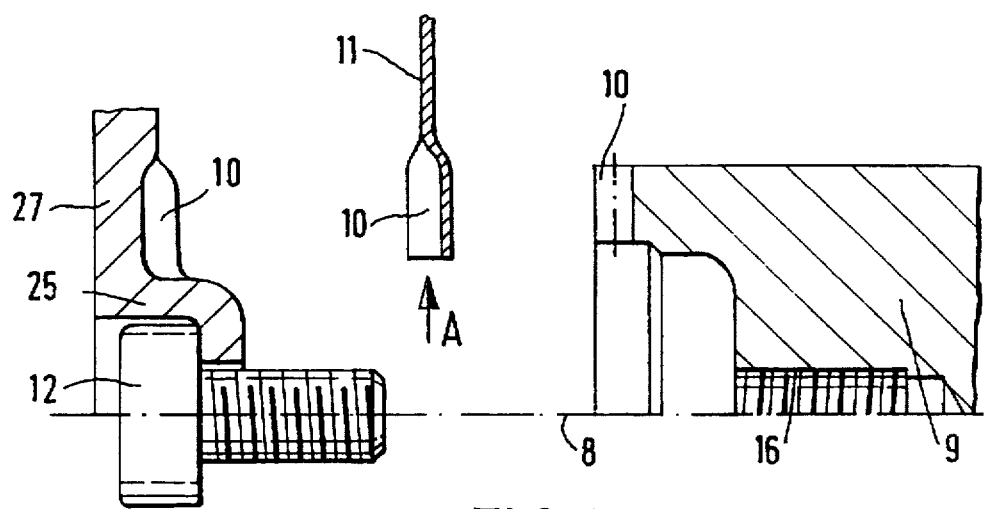

In FIGS. 7a and 7b a partial cross section is shown of a fastening of the centrifugal mass 11 between the gear teeth 10 of the pot-shaped component 25 and the gear teeth 10 of the crankshaft 9. The arrow A indicates the direction of the view shown in FIG. 7b, which direction is outwardly radially directed.

Figure 8:
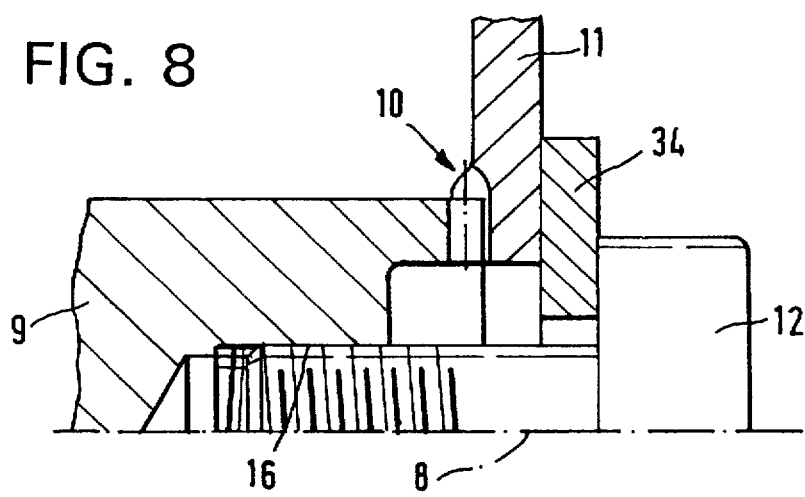
FIG. 8 is a partial longitudinal section through a connection with the plate spring.

FIG. 8 illustrates an embodiment in which the gear teeth 10 may be introduced both into the radially inner area of the disc 11 and into the crankshaft 9. There can be a fastening screw 12 which, with the interposition of a plate spring 34, can hold the gear teeth 10 in the functional position. The axial bias can thereby be applied by the plate spring 34.

A particularly simple assembly process can be made possible by the fact that the outside diameter of the head of the fastening screw 12 can be larger than the inside diameter of the ring-shaped area of the gear teeth 10, so that the fastening screw 12 need only be screwed in as far as possible, and the bias of the plate spring 34 can therefore essentially be automatically ensured.

Figure 9:
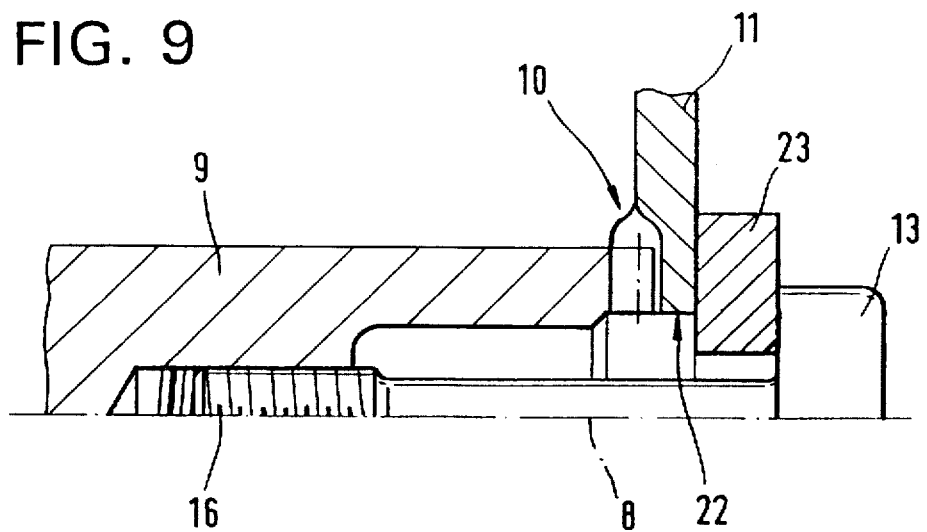
FIG. 9 is a partial longitudinal section through a connection with the packing disc.

In FIG. 9, in accordance with another embodiment of the present invention, the connection between the crankshaft 9 and the disc 11 with the gear teeth 10 can be realized so that an anti-fatigue screw 13 may be screwed into the crankshaft 9, whereby the shaft of the crankshaft 9 can apply the axial elasticity for the firm clamping of the gear teeth 10. Between the head of the anti-fatigue screw 13 and the disc 11, there can be a packing disc 23. Packing disc 23 can be realized so that it can essentially be inelastic in the axial direction. This construction can use a conventional anti-fatigue screw, but this construction can also have a greater axial length than the construction illustrated in FIG. 8.

Figure 9A:
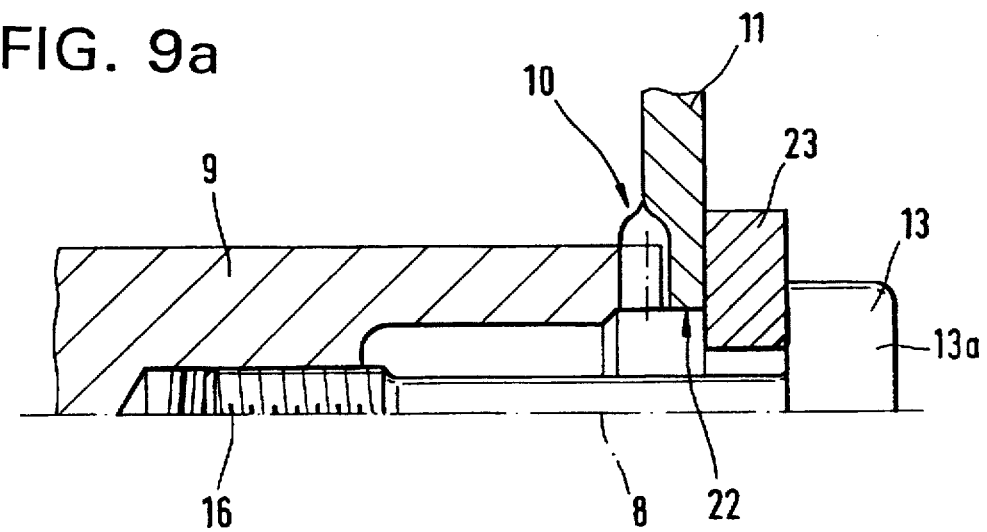
FIG. 9a is essentially the same as FIG. 9, but is more detailed.

FIG. 9a shows, in accordance with at least one embodiment of the present invention, the screw 13 screwed into place within the crankshaft 9 by means of threads 16. Of course, the gear teeth 10 of the crankshaft 9 and the gear teeth 10 of the disc 11 are engaged. During operation of the clutch, forces created by operation can be transmitted from the screw head 13a to the disc 11. With placement of the packing disc 23 between the screw head 13a and the axially inner portion of the disc 11 (axially opposite the gear teeth 10 of the disc 11), operationally-created forces can be transmitted from the screw head 13a to the packing disc 23, and from the packing disc 23 to the crankshaft 9. Forces can also be transmitted in a direction essentially reverse to that just described. A function of the packing disc 23 can be to spread transmitted forces over a larger surface area of the disc 11 as well as the screw head 13a of the screw 13. This spreading of forces can lead to a longer working life for the screw 13, the disc 11, the crankshaft 9, and the gear teeth 10.

Figure 10A:
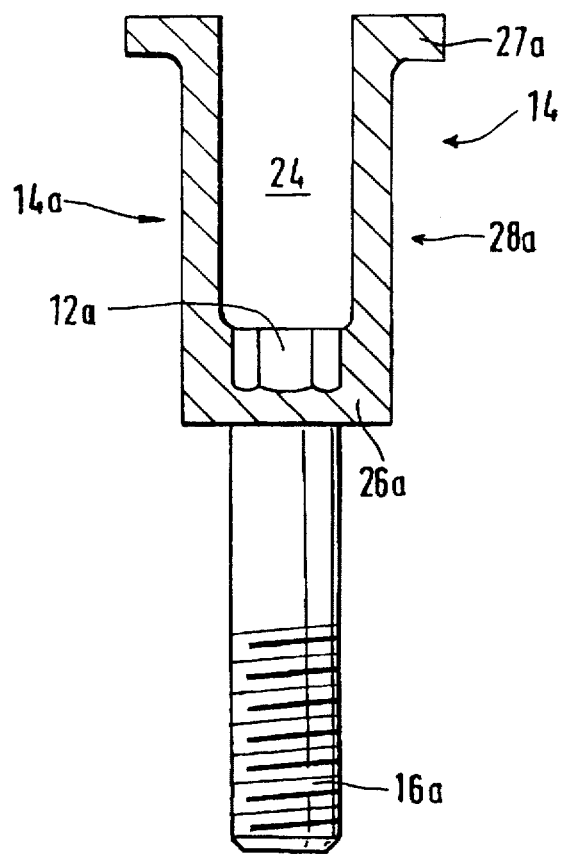
FIG. 10a shows an embodiment of an anti-fatigue screw.
Figure 10B:
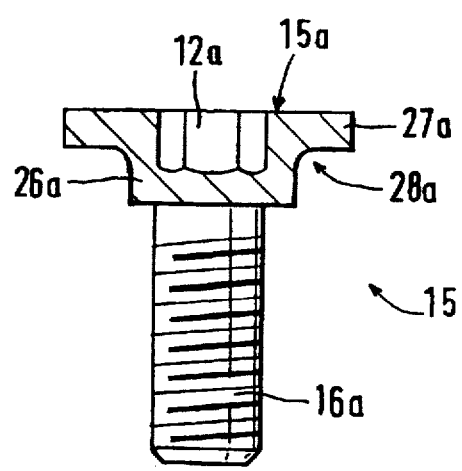
FIG. 10b shows an embodiment of an anti-fatigue screw.

FIGS. 10a and 10b show two different anti-fatigue screws 14 and 15, respectively. The anti-fatigue screw 14 can be equipped with an axially elongated head which can have a corresponding hole 24. In the terminal area of the head, the diameter of the head may be adapted so that it can overlap the ring-shaped area of the gear teeth 10, and in this area can be in axially flexible contact with the centrifugal mass 11 (i.e. the disc 11 as a portion of the centrifugal mass 1).

FIG. 10b shows an anti-fatigue screw in which the head can be axially flexible without the elongation of the anti-fatigue screw 14. The use of one type of anti-fatigue screw or another will essentially be dictated, more or less, by the conditions of the other components, particularly the crankshaft 9.

At this point it should be noted that the crankshaft 9 and the centrifugal mass 1 can essentially be centered exclusively by means of the gear teeth 10, which gear teeth 10 can have a self-centering action on account of their special configuration.

The screw 14 can have an axially elongated screw head 14a, which screw head 14a can have a corresponding hole 24. The screw head 14a can have a recess 12a for the insertion of a tool, such as a hex key. Various parts of the screw head 14a can include the tool application recess 12a, a base part 26a, a pot-shaped body 28a, and a pot edge 27a.

The screw 15 is shown as having a shorter shank 16a than the shank 16a of the screw 14 shown in FIG. 10a. Additionally, the head 15a of the screw 15 can be less elongated in the axial direction than the head 14a of the screw 14. The head 15a of the screw 15 can have a pot-shaped body 28a, a recess 12a, a base part 26a, and a pot edge 27a.

In accordance with at least one embodiment of the present invention, it is possible that a screw 14, as depicted in FIG. 10a, or a screw 15, as depicted in FIG. 10b, can have applications wherein the use of a screw 14 or screw 15 can be more appropriate than the use, for instance, of separate parts such as a screw 12 and a component 25, as described further above with reference to FIG. 1.

Figure 11:
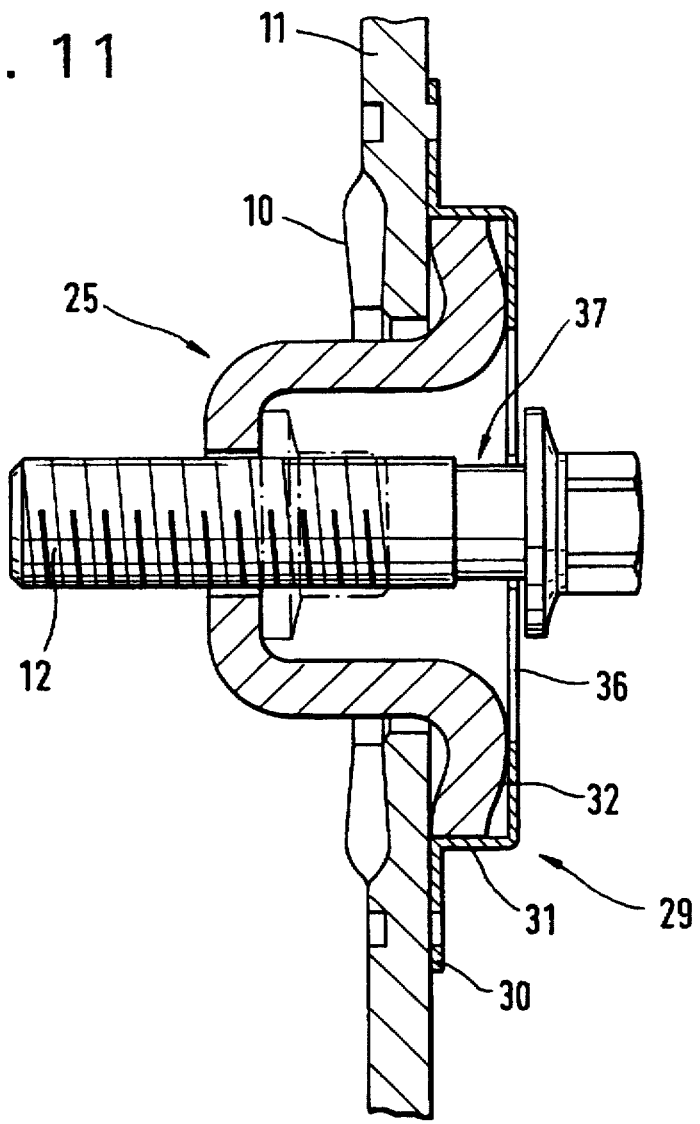
FIG. 11 shows a partial longitudinal section through a pre-assembled component with a captive fastening screw.

FIG. 11 shows a partial longitudinal section through the pot-shaped component 25, which can be fastened to the disc 11 by means of a retaining element 29. The retaining element 29, in the vicinity of its base 32, is preferably provided with a plurality of tabs 36 which can be distributed over the periphery and extend radially inward, which tabs 36 may be arranged so that in their radially inward terminal area they can be engaged in the threads of the fastening screw 12 or—as illustrated—in the thread runout 37 between the thread and the head of the fastening screw 12. Thus the fastening screw 12 may be pre-assembled in a captive manner, and—after the introduction of the pot-shaped component 25 into the corresponding opening 19 of the crankshaft 9—can be tightened by screwing it into the thread 16. The tabs 36 can thereby be deformed elastically or plastically, and make possible the passage of the head of the fastening screw 12.

It should be understood that the terms "anti-fatigue screw", "externally relieved bolt", "necked-down bolt", and "waisted bolt" can be used interchangeably throughout the instant application to mean one and the same thing.

One feature of the present invention resides broadly in the attachment of a flywheel or of a modular clutch, comprising centrifugal mass, housing, application plate, spring, clutch disc with friction linings and hub for the non-rotational attachment to the transmission shaft, to the output-side end of a crankshaft of an internal combustion machine, whereby the torque transmission and the centering of both parts is accomplished by an axially-directed toothing, e.g. a serration, which is introduced in both the parts to be connected in a ring-shaped area which is concentric to the axis of rotation, and this toothing is held in the active position by a central screw element in a thread in the crankshaft, whereby the screw element penetrates the parts to be connected inside the ring-shaped areas in corresponding openings, characterized by the fact that the two components 9, 11 realized with the gear teeth 10 are connected to one another and held under axial spring bias.

Another feature of the present invention resides broadly in the centrifugal mass characterized by the fact that the central screw element is realized in the form of an anti-fatigue screw (externally relieved bolt, necked-down bolt, or waisted bolt) 13, 14, 15.

Yet another feature of the present invention resides broadly in the centrifugal mass characterized by the fact that the centrifugal mass 1, 11, in its radially inner area immediately radially inside the gear teeth 10, extends by means of a collar 18 pointing in the axial direction toward the crankshaft 9 into a corresponding concentric opening 19 in the crankshaft 19 for pre-centering, and the base 20 of the collar 18 is provided with a passage opening 21 for the anti-fatigue screw 13.

Still another feature of the present invention resides broadly in the centrifugal mass characterized by the fact that the centrifugal mass 11 is bordered radially inside the gear teeth 10 by the opening 22, the screw head of the anti-fatigue screw 13 has an outside diameter which is approximately equal to the opening 22, and an essentially inelastic packing disc 23 is located axially between the centrifugal mass 11 and the screw head.

A further feature of the present invention resides broadly in the centrifugal mass characterized by the fact that the centrifugal mass 11 is bordered radially inside the gear teeth 10 by the opening 22, and the diameter of the screw head of the anti-fatigue screw 15 is enlarged so that it essentially axially covers, or overlaps, the ring-shaped area of the gear teeth 10 in the centrifugal mass 11, and in this area is in axially flexible contact with the centrifugal mass 11.

Another feature of the present invention resides broadly in the centrifugal mass characterized by the fact that the screw head of the anti-fatigue screw 14 is elongated in the axial direction, and has a hole 24 which extends over a portion of the elongated portion.

Yet another feature of the present invention resides broadly in the centrifugal mass characterized by the fact that the central screw element is realized in the form of a relatively inelastic fastening screw 12 and between the fastening screw 12 and the ring-shaped area of the centrifugal mass 11 there is a pot-shaped component 25, in the bottom part 26 of which there is a passage opening 21 for the passage of the fastening screw 12, and the encircling pot edge 27 of which projects outward, and is realized elastically in the form of a plate spring, and at some radial distance from the pot body 28, is in contact with the ring-shaped area of the centrifugal mass 11.

Still another feature of the present invention resides broadly in the centrifugal mass characterized by the fact that the pot edge 27, on the side facing the ring-shaped area of the centrifugal mass 11, preferably has a curved contour.

A further feature of the present invention resides broadly in the centrifugal mass characterized by the fact that the pot-shaped component 25 is fastened in a captive manner by means of a retaining element 29 which is located on the centrifugal mass 11 radially outside the ring-shaped area.

Another feature of the present invention resides broadly in the centrifugal mass characterized by the fact that the retaining element 29 consists of a sheet-metal part which is realized approximately in the shape of a pot, with a pot edge 30 which is perpendicular to the axis of rotation 8, which pot edge 30 is in contact with the centrifugal mass 11 on the side facing opposite the gear teeth 10 and is fastened there, a pot wall 31 which is concentric to the axis of rotation 8 and which can include the pot edge 27 of the component 25, and a base 32 with an opening, which base axially fixes the component 25 in position.

Yet another feature of the present invention resides broadly in the centrifugal mass characterized by the fact that the central opening is realized such that the base 32 also fixes the screw element 12 in a captive manner.

Still another feature of the present invention resides broadly in the centrifugal mass characterized by the fact that for pre-centering during the assembly of the centrifugal mass 10 or of the modular clutch 2 and the crankshaft 12, the outside diameter of the pot-shaped body 28 is inserted with a small radial clearance into a corresponding opening 19 in the crankshaft 9.

A further feature of the present invention resides broadly in the centrifugal mass characterized by the fact that in connection with a modular clutch 2, the screw element 12 is held captive in the component 25 by means of its head, the diameter of which is coordinated with the diameter of the internal gear teeth 33 of the hub 7 of the clutch disc 6 (i.e. the diameter of the head is greater than the inside diameter of the internal gear teeth 33), and the length of the screw element 12 is at least large enough that, when there is contact between the head and the hub 7, the threaded part extends into the opening 21 of the base part 26 of the component 25.

Another feature of the present invention resides broadly in the centrifugal mass characterized by the fact that the central screw element 12 is realized in the form of a relatively inelastic fastening screw, and a plate spring 34 under bias is located between the head of the screw element 12 and the ring-shaped area of the centrifugal mass 1, 11.

Yet another feature of the present invention resides broadly in the centrifugal mass characterized by the fact that the outside diameter of the head of the fastening screw 12 is kept larger than the inside diameter of the opening 22 in the centrifugal mass 1, 11.

Still another feature of the present invention resides broadly in the centrifugal mass characterized by the fact that both in the crankshaft 9 and in the pot-shaped component 25, there are gear teeth 10 which point toward one another, the centrifugal mass 11 is realized in the form of a thin-walled component, at least in the ring-shaped area, and the material cross section of this component matches the cross section of the gear teeth 10, and the centrifugal mass is clamped between the gear teeth 10 of the crankshaft 9 and component 25.

A further feature of the present invention resides broadly in the centrifugal mass characterized by the fact that the pot-shaped component 25 is radially fixed by means of the outside diameter of its pot edge 27 in a corresponding recess 35 in the flywheel 1, 11, on the side farther from the crankshaft 9.

Another feature of the present invention resides broadly in the centrifugal mass characterized by the fact that the gear teeth 10 are realized so that the flanks of the individual teeth form a cone which is concentric to the axis of rotation 8, whereby the cone intersects the axis of rotation 8 outside the crankshaft 9.

Yet another feature of the present invention resides broadly in the centrifugal mass characterized by the fact that the base 32 has several tabs 36 which point radially inward, and which in the pre-assembled state, are engaged in threads of the fastening screw 12 or in the space between the head-side thread runout 37 and the head.

Some examples of clutch assemblies and various components associated therewith which could possibly utilize the present invention may be disclosed in the following U.S. Pat. Nos.: Pat. No. 4,684,007 to Maucher, entitled "Clutch Plate"; Pat. No. 4,635,780 to Wiggen, entitled "Clutch Disc for a Motor Vehicle Friction Clutch"; Pat. No. 4,651,857 to Schraut et al., entitled "Clutch Disc Unit for a Motor Vehicle Friction Clutch"; Pat. No. 5,103,688 to Kuhne, entitled "Two-mass Flywheel"; Pat. No. 4,777,843 to Bopp, entitled "Two-mass Flywheel Assembly With Viscous Damping Assembly"; and Pat. No. 5,279,183 to Forster et al., entitled "Combination of a Crankshaft and a Flywheel".

Additional examples of clutch assemblies and various components associated therewith which could be used in conjunction with the present invention may be disclosed in the following U.S. Pat. Nos.: Pat. No. 5,117,959 entitled "Torsion Damping Device in Particular for Automotive Vehicles" to Valeo; No. 4,763,767 entitled "Torsional Damping Device" to Valeo; No. 4,667,801 entitled "Clutch Disc Arrangement" to Fichtel & Sachs; No. 5,238,096 entitled "Clutch Plate for a Motor Vehicle Friction Clutch" to Fichtel & Sachs; and No. 5,016,744 entitled "Clutch Disc for a Friction Clutch" to Fichtel & Sachs.

Some examples of transmissions in which the present invention may be incorporated may be disclosed by the following U.S. Pat. Nos.: 5,199,316 to Hoffman, entitled "Fully-Synchronized Multiple Speed Manual Transmission for Motor Vehicles"; 4,458,551 to Winter, entitled "Manual Transmission"; and 3,858,460 to Porter et al., entitled "Four Speed Manual Transmission and Control".

Some examples of two-mass flywheels and the components thereof which may incorporate the present invention therein may be disclosed by the following U.S. Pat. Nos.: No. 5,103,688 which issued to Kuhne on Apr. 14, 1992, entitled "Two-Mass Flywheel"; No. 4,777,843 which issued to Bopp on Oct. 18, 1988, entitled "Two-Mass Flywheel Assembly With Viscous Damping Assembly"; No. 5,261,516 which issued to Friedman on Nov. 16, 1993, entitled "Twin-flywheel Apparatus for Transmitting Torque in the Power Train of Motor Vehicle"; No. 5,307,710 which issued to Feldhaus et al. on May 3, 1994, entitled "Two-mass Flywheel"; No. 5,377,560 which issued to Schierling and Sudau on Jan. 3, 1995, entitled "Double-mass Flywheel"; and No. 5,471,896 which issued to Schierling et al. on Dec. 5, 1995, entitled "Dual-mass Flywheel".

Some examples of modular clutches and components thereof which may be used in conjunction with the present invention may be disclosed by the following U.S. Pat. Nos.: No. 5,392,888 which issued to Kajitani et al. on Feb. 28, 1995, entitled "Modular Clutch Construction"; No. 5,404,979 which issued to Craft et al. on Apr. 11, 1995, entitled "Motor Vehicle Manual Transmission Modular Clutch Assembly"; and No. 5,191,810 which issued to Craft et al. on Mar. 9, 1993, entitled "Vehicle Modular Clutch Attaching Arrangement".

Some examples of torque converters and components thereof which may be used in conjunction with the present invention may be disclosed by the following U.S. Pat. Nos.: No. 5,377,562 which issued to Kitagawa and Suzuki on Jan. 3, 1995, entitled "Driven Wheel Torque Control System"; No. 5,462,145 which issued to Gimmler on Oct. 31, 1995, entitled "Hydrokinetic Lockup Torque Converter with Lockup Clutch"; No. 5,465,575 which issued to Shimmell on Nov. 14, 1995, entitled "Torque Converter and Method for Producing the Same"; No. 5,466,195 which issued to Nogle et al. on Nov. 14, 1995, entitled "Input Compounding Torque Converter"; and No. 5,477,950 which issued to Maloof on Dec. 26, 1995, entitled "Noise and Vibration Reduction in a Torque Converter Clutch Assembly".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 18 678.8, filed on May 22, 1995, having inventors Achim Link, Heiko Schulz-Andres, Reinhold Weidinger, Klaus Gorzitke, Günther Esly, Andreas Krause, Thomas Stretz, Markus Wirbel, and Reinhard Deppert, and DE-OS 195 18 678.8 and DE-PS 195 18 678.8, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch assembly, for use in connection with an internal combustion engine, said assembly comprising:
   a crankshaft;
   a friction clutch;
   said friction clutch comprising:
      a flywheel;
      a clutch housing;
      a hub;
      said hub defining an axis of rotation and an axial direction parallel to the axis of rotation;
      a clutch disc disposed within said clutch housing, said clutch disc coaxially surrounding said hub;
      a pressure plate disposed within said clutch housing and movable in the axial direction, said pressure plate for applying an axial force to said clutch disc along the axial direction;
      said flywheel being disposed substantially adjacent said clutch disc;
      said clutch disc comprising at least one friction lining; and
      said at least one friction lining being disposed substantially between said pressure plate and said flywheel;
   means for meshing said friction clutch with said crankshaft; said means for meshing comprising:
      a ring-shaped surface disposed on said crankshaft, said ring-shaped surface being disposed about and substantially transverse to said axis of rotation;
      said ring-shaped surface comprising raised and recessed portions disposed toward said friction clutch;
      said raised and recessed portions projecting axially toward said friction clutch; and
      interlocking connections disposed on said friction clutch, said interlocking connections being disposed to mesh with said raised and recessed portions on said crankshaft; and
   a connecting structure to connect said crankshaft and said friction clutch;
   said connecting structure comprising a screw element;
   said screw element being disposed to fasten said crankshaft and said clutch;
   said connecting structure comprising a springy portion;
   said springy portion being disposed to be biased by said screw element;

said springy portion being disposed to provide an axial bias on said means for meshing and to bias said clutch toward said crankshaft.

2. The assembly according to claim 1 wherein:

said flywheel comprises a disc portion having a hole therethrough;

said disc portion is disposed about said axis of rotation;

said screw element is disposed through said ring-shaped surface; and said screw element is disposed through said hole in said disc portion.

3. The assembly according to claim 2 wherein:

said screw element comprises an anti-fatigue screw;

said disc portion comprises a collar disposed about said hole;

said crankshaft comprises a concentric opening for receiving said collar;

said collar extends in said axial direction into said concentric opening in said crankshaft;

said anti-fatigue screw is disposed through said collar;

said raised and recessed portions comprise axially directed gear teeth; and said interlocking connections comprise gear teeth for transmission of force from said crankshaft to said flywheel.

4. The assembly according to claim 2 wherein:

said screw element comprises a substantially inelastic fastening screw;

said connecting structure comprises a separator element;

said separator element has a central axis parallel to said axis of rotation;

said separator element is disposed between said fastening screw and said disc portion;

said separator element comprises:
 a cylindrical wall having a first end and a second end;
 a bottom, said bottom being disposed at said second end of said cylindrical wall, substantially transverse to said cylindrical wall;
 said bottom having a hole therethrough for said substantially inelastic fastening screw;
 a flange, said flange being disposed at said first end of said cylindrical wall and extending radially outward from said cylindrical wall; and
 said flange forming a plate spring;

said disc portion having a first side and a second side;

said first side of said disc portion being disposed toward said crankshaft;

said separator element being disposed through said hole in said disc portion;

at least a portion of said flange being disposed in contact with said second side of said disc portion;

said substantially inelastic fastening screw being disposed through said hole in said bottom of said separator element;

said raised and recessed portions comprise axially directed gear teeth; and said interlocking connections comprise gear teeth for transmission of force from said crankshaft to said flywheel.

5. A friction clutch, for use in connection with an internal combustion engine, said friction clutch comprising:

a flywheel;

a clutch housing;

a hub;

said hub defining an axis of rotation and an axial direction parallel to the axis of rotation;

a clutch disc disposed within said clutch housing, said clutch disc coaxially surrounding said hub;

a pressure plate disposed within said clutch housing and movable in the axial direction, said pressure plate for applying an axial force to said clutch disc along the axial direction;

said flywheel being disposed substantially adjacent said clutch disc;

said clutch disc comprising at least one friction lining;

said at least one friction lining being disposed substantially between said pressure plate and said flywheel;

means for meshing said friction clutch with a crankshaft;

said means for meshing comprising:
 a ring shaped surface disposed on said friction clutch, said ring shaped surface being disposed about said axis of rotation;
 said ring shaped surface comprising raised and recessed portions to be disposed toward and to enmesh with a crankshaft; and
 said raised and recessed portions projecting substantially axially from said ring shaped surface;

a connecting structure to connect said friction clutch to a crankshaft;

said connecting structure comprising a screw element;

said screw element being disposed to fasten said friction clutch to the crankshaft;

said connecting structure comprising a springy portion;

said springy portion being disposed to be biased by said screw element; and said springy portion being disposed to provide an axial bias on said means for meshing and to bias said clutch toward the crankshaft.

6. The friction clutch according to claim 5 wherein:

said flywheel comprises a disc portion having a hole therethrough, said hole having a diameter;

said screw element is disposed through said ring shaped surface on said friction clutch;

said screw element is disposed through said hole in said disc portion; and said screw element is configured to be threaded into a crankshaft.

7. The friction clutch according to claim 6 wherein:

said disc portion comprises a collar disposed about said hole;

said collar is disposed to be received by a crankshaft;

said collar extends in said axial direction into a crankshaft; and said screw element is disposed through said collar into a crankshaft.

8. The friction clutch according to claim 7 wherein:

said screw element comprises an anti-fatigue screw;

said anti-fatigue screw comprises:
 a screw head having an outside diameter; and
 a shaft;

said outside diameter of said head of said anti-fatigue screw is substantially equal to said diameter of said hole in said disc portion;

said friction clutch comprises a packing disc, said packing disc being substantially inelastic;

said packing disc being disposed about said shaft of said anti-fatigue screw; and said packing disc is disposed between said screw head and said disc portion to prevent travel of said screw head through said hole in said disc portion.

9. The friction clutch according to claim 7 wherein:

said ring-shaped surface has an outside diameter;

said screw element comprises an anti-fatigue screw;

said anti-fatigue screw comprises:
 a screw head having an outside diameter; and
 a shaft;

said outside diameter of said screw head is substantially larger than said diameter of said hole in said disc portion;

said outside diameter of said screw head is substantially equal to said outside diameter of said ring-shaped surface; and said screw head is disposed in axially flexible contact with said disc portion.

10. The friction clutch according to claim 9 wherein:

said screw head extends a substantial distance in said axial direction; and said screw head comprises a recessed area extending in said axial direction.

11. The friction clutch according to claim 6 wherein:

said screw element comprises a substantially inelastic fastening screw;

said connecting structure comprises a separator element, said separator element having a central axis, said central axis being parallel to said axial direction;

said separator element is disposed between said fastening screw and said disc portion;

said separator element comprises:
 a cylindrical wall having a first end and a second end;
 a bottom, said bottom being disposed at said second end of said cylindrical wall and substantially transverse to said cylindrical wall;
 said bottom having a hole therethrough for receiving said inelastic fastening screw;
 a flange, said flange being disposed at said first end of said cylindrical wall and extending radially outward from said cylindrical wall; and
 said flange forms a plate spring;

said disc portion has a first side and a second side;

said first side of said disc portion is to be disposed toward a crankshaft;

said separator element is disposed through said hole in said disc portion;

at least a portion of said flange is disposed in contact with said second side of said disc portion; and said substantially inelastic fastening screw is disposed through said hole in said bottom of said separator element.

12. The friction clutch according to claim 11 comprising:

a retaining element for biasing said separator element and said disc portion in contact;

said retaining element comprising:
 a first portion disposed in contact with said second side of said disc portion, radially outside of said ring shaped surface;
 a second portion disposed at about a 90° angle to said first portion, extending away from said disc portion; and
 a third portion disposed at about a 90° angle to said second portion and parallel to said first portion, extending toward said axis of rotation; and said third portion of said retaining element being disposed against said separator element to bias said separator element against said disc portion;

said flange being substantially one of:

curved in the area disposed in contact with said friction disc; and straight in the area disposed in contact with said friction disc.

13. The friction clutch according to claim 12 wherein said third portion of said retaining element is disposed to hold said substantially inelastic fastening screw in a fixed position.

14. The friction clutch according to claim 13 wherein:

said separator element has an outside diameter, said outside diameter being defined by an outside diameter of said cylindrical wall; and said outside diameter of said separator element being less than the inner diameter of a receiving opening in a crankshaft to provide precentering during assembly.

15. The friction clutch according to claim 14 wherein:

said hub comprises internal gear teeth, said hub having an internal diameter inside the internal gear teeth;

said bottom of said separator element is disposed a distance from said hub;

said substantially inelastic fastening screw comprises:
 a screw head having a diameter; and
 a threaded shaft having an axial length;

said diameter of said head of said substantially inelastic fastening screw is greater than the internal diameter of said hub to prevent said head of said substantially inelastic fastening screw to extend through said hub; and said length of said shaft of said substantially inelastic fastening screw is greater than said distance between said hub and said bottom of said separator element.

16. The friction clutch according to claim 15 comprising:

a plate spring;

said plate spring being under bias;

said plate spring being disposed between said head of said inelastic fastening screw and said ring-shaped area; and said head of said substantially inelastic fastening screw is larger than said hole in said disc portion.

17. The friction clutch according to claim 16 wherein:

a portion of said disc portion comprises a narrowed portion;

said flange of said separator element comprises said ring shaped surface;

said ring shaped surface of said flange is disposed in contact with said narrowed portion of said disc portion; and said narrowed portion of said disc portion is clamped between said flange and a crankshaft.

18. The friction clutch according to claim 17 wherein:

said disc portion comprises a recessed region on said second side of said disc portion; and said flange of said separating element is disposed in said recessed region of said disc portion.

19. The friction clutch according to claim 18 wherein:

said raised and recessed portions comprise gear teeth;

said gear teeth are configured to be angled substantially toward said axis of rotation;

said third portion of said retaining element comprises at least one tab, said at least one tab being disposed to project from said retaining element toward said axis of rotation;

said shaft of said substantially inelastic fastening screw comprises:

a threaded portion; and a non-threaded portion disposed between said threaded portion and said head of said screw;

said tabs being disposed to engage one of:

said threaded portion of said shaft of said substantially inelastic fastening screw; and said non-threaded portion of said shaft of said inelastic fastening screw.

* * * * *